(12) United States Patent
Dackefjord et al.

(10) Patent No.: US 10,723,314 B2
(45) Date of Patent: Jul. 28, 2020

(54) VEHICLE ALARM SYSTEM WITH MULTIPLE DEVICES

(71) Applicant: NiDa Tech Sweden AB, Malmö (SE)

(72) Inventors: Håkan Dackefjord, Årsta (SE); Warwick Taws, Bromma (SE)

(73) Assignee: NIDA TECH SWEDEN AB, Malmö (SE)

(*) Notice: Subject to any disclaimer, the term of this patent is extended or adjusted under 35 U.S.C. 154(b) by 35 days.

(21) Appl. No.: 15/947,909

(22) Filed: Apr. 9, 2018

(65) Prior Publication Data
US 2018/0222443 A1 Aug. 9, 2018

Related U.S. Application Data

(63) Continuation of application No. PCT/SE2016/050956, filed on Oct. 6, 2016.

(30) Foreign Application Priority Data

Oct. 9, 2015 (SE) ...................................... 1551312

(51) Int. Cl.
*B60R 25/102* (2013.01)
*B60R 25/33* (2013.01)
*B60R 25/40* (2013.01)
*B60R 25/32* (2013.01)

(52) U.S. Cl.
CPC .......... *B60R 25/1025* (2013.01); *B60R 25/32* (2013.01); *B60R 25/33* (2013.01); *B60R 25/403* (2013.01); *B60R 2225/00* (2013.01)

(58) Field of Classification Search
CPC ... B60R 25/1025; B60R 25/33; B60R 25/403; B60R 25/32; B60R 2225/00; G01C 21/00; G01S 19/42; G08B 13/00
See application file for complete search history.

(56) References Cited

U.S. PATENT DOCUMENTS

| | | | |
|---|---|---|---|
| 5,900,814 A * | 5/1999 | Stern | B60R 25/102 340/426.16 |
| 5,917,423 A | 6/1999 | Duvall | |
| 6,901,263 B2 * | 5/2005 | Gerner | B60R 25/102 455/456.1 |
| 8,665,068 B2 * | 3/2014 | Karabinis | G01D 21/00 340/10.1 |
| 9,452,732 B1 * | 9/2016 | Hermann | B60R 25/10 |
| 9,688,246 B2 * | 6/2017 | Kleve | G08B 25/016 |
| 2002/0163449 A1 * | 11/2002 | Flick | B60R 25/04 340/988 |

(Continued)

FOREIGN PATENT DOCUMENTS

| DE | 102008057862 A | 4/2010 |
|---|---|---|
| EP | 2308724 A1 | 4/2011 |

(Continued)

*Primary Examiner* — Adnan Aziz
(74) *Attorney, Agent, or Firm* — Gabriela B. Tomescu, Esq.; Bergenstråhle & Partners AB (57) ABSTRACT

A vehicle alarm system comprising a primary device and at least one secondary device. The primary device is adapted to be connected to the vehicle and the secondary device is adapted to not be connected to the vehicle but adapted to be arranged in the vehicle, wherein the secondary device is adapted to take the role of the primary device if the primary device is disabled or removed from the vehicle.

19 Claims, 6 Drawing Sheets

(56) References Cited

U.S. PATENT DOCUMENTS

| | | | |
|---|---|---|---|
| 2005/0200479 A1* | 9/2005 | James | B60Q 1/52 340/539.18 |
| 2006/0089790 A1* | 4/2006 | Dupuis | G07C 5/008 701/408 |
| 2006/0111822 A1* | 5/2006 | Simon | B60R 25/1003 701/468 |
| 2009/0046538 A1* | 2/2009 | Breed | B60C 11/24 367/93 |
| 2009/0207050 A1 | 8/2009 | Arpin et al. | |
| 2011/0012726 A1* | 1/2011 | Jessiman | G08B 25/008 340/501 |
| 2011/0063138 A1 | 3/2011 | Berkobin et al. | |
| 2012/0309422 A1* | 12/2012 | Lewis-Evans | B60R 25/1025 455/456.1 |
| 2015/0091713 A1* | 4/2015 | Kohlenberg | B60R 25/32 340/426.36 |

FOREIGN PATENT DOCUMENTS

| | | |
|---|---|---|
| EP | 2747004 A1 | 6/2014 |
| WO | 0140822 A1 | 6/2001 |
| WO | 2014007754 A2 | 1/2014 |
| WO | 2014184543 A1 | 11/2014 |

\* cited by examiner

VEHICLE ALARM SYSTEM WITH MULTIPLE DEVICES

This application is the continuation of International Application No. PCT/SE2016/050956, filed 6 Oct. 2016, which claims the benefit of Swedish Patent Application No. SE 1551312-0, filed 9 Oct. 2015, the entire contents of which are hereby incorporated by reference.

TECHNICAL FIELD

The present invention relates generally to a vehicle alarm system comprising multiple devices.

BACKGROUND ART

There are many different solutions for vehicle alarms available in the prior art. Most solutions are developed to become harder and harder to override if the vehicle is stolen but also to enable both positioning and communication with a stolen vehicle. Conventional vehicle alarms uses sound and sometimes light, such as blinking indicator lights, to scare a thief away or draw attention to the vehicle before the thief manage to steal the vehicle. This is an effective solution but there are many examples where cars been stolen without anyone noticing.

In order to overcome some of those issues the prior art further presents solutions for accurately positioning of vehicles that have been stolen and moved from their original position. The most common solution is that a GPS chip is incorporated to the vehicle or the vehicle alarm that can transmit the vehicles position back to the owner or to the police. This has reduce the number of vehicles that are stolen and not recovered, however the methods utilized by the thieves are constantly evolving and methods for disabling such systems are commonly used. For example, by placing a stolen vehicle in a container that shields the GPS signal the vehicle can be hidden away until the initial risk of being caught is reduced. Similar methods are used to drain or remove the battery of the vehicle and await that the positioning devices stops functioning.

Another drawback with the present positioning solutions is that GPS signals and most other positioning system signals are easy to both track and block with a tracker or signal blocker. For example, a common GPS signal can be blocked with a signal blocker arranged in the vehicle making it invisible for tracking. Another method for disabling the positioning system is to use a signal tracer and finding out where the antenna or device is arranged within the vehicle and then remove it.

Additional functionality have in the prior art been incorporated to alarm system including for example immobilizers that prevents the engine of a vehicle from starting. Those limits the risk for the vehicle being started and driven away but do not help if the car is towed or lifted onto a truck.

Thus it would be advantageous to provide a solution that addresses at least some of the problems with the prior art.

SUMMARY OF INVENTION

An object of the present invention is to provide an alarm system for a vehicle that is difficult to disable and that automatically adapts if parts of the system are disabled.

Another object of the present invention is to provide an alarm system that enables positioning of a vehicle.

Another object of the present invention is to provide an alarm system that is difficult to remove from a vehicle.

Another object of the present invention is to provide an alarm system that is difficult to block with signal blockers.

Yet another object of the present invention is to provide an alarm system wherein the devices of the system are hard to find based on signal tracing.

Thus the solution relates to a vehicle alarm system comprising a primary device and at least one secondary device wherein the primary devices is connected to the electrical system of a vehicle and gets its power from the vehicle. The primary devices further comprises multiple communication means that utilizes different frequencies for communication. The secondary device is not connected to the vehicle but is arranged within the vehicle and spends most of its time in a sleep mode. However, the secondary devices comprises substantially the same components as the primary devices and can therefore, if necessary, perform the same tasks. Thereby the solution relates to a distributed vehicle alarm system and a primary and secondary devices thereof, wherein the vehicle alarm system is hard to disable, enables positioning of a vehicle, is difficult to remove form the vehicle, and is difficult to find or block with signal tracers.

According to an embodiment of a primary device for use in a vehicle alarm system, wherein the primary device comprises first communication means adapted to enable positioning of said primary device, connection means adapted to connect the primary device to an electric system in a vehicle, and second communication means adapted for data communication. The primary device is arranged in the vehicle and the connection means connects the primary device to a power source of said vehicle. The second communication means is adapted to communicate with a secondary device arranged in said vehicle, and said first communication means is adapted to enable tracking of the primary device.

It is one advantage with the present solution that the primary device comprises connection means that are connected to the vehicle. The connection means allows for a power supply that is automatically recharged in order for the vehicle to function. The power source can in one embodiment be a vehicle battery, such as a car battery, but it can also be other power sources of a vehicle such as a solar panel, generator, or any other form of power source that is used for other purposes than the primary device. In one embodiment the primary device has its own power source that the connection means connects the primary device to. In one embodiment is such a power source rechargeable by the vehicle.

It is another advantage with the present solution that multiple frequencies and communication means are used. Each communication means, as described herein, are adapted to be used for one specific frequency or frequency range associated with a standard, or range that is beneficial for transmission of information. The person skilled in the art understands that the communication means can be a single chip enabling communication through multiple different standards or different chips enabling communication through one standard each.

According to an embodiment the primary device further comprises detection means adapted to detect if the vehicle is moving and the primary device is adapted to transmit a message to the secondary device through the second communication means indicating that the primary device is active when the detection means indicates that the vehicle has started to move.

It is one advantage with the present solution that almost all calculations and decisions in a normal operation state of the alarm system are made by the primary device. A normal state refers to a situation wherein the vehicle is not stolen. The primary device serves the purpose of coordinating a mesh network of devices comprising at least one primary device and one secondary device. However, in one embodiment are multiple secondary devices part of the network and all devices, at least occasionally, receives an acknowledgement message indicating that the primary device is active and still functional. This has the advantage that the primary device solves most of the problems that regularly occurs in a vehicle alarm, such as sounding the alarm siren, flashing lights, enabling immobilizers, and similar operations. It should be noted that the person skilled in the art understands that different forms of operation can be performed within the alarm system depending of the purpose with the specific configuration of a specific alarm system.

It is another advantage that the detection means in the primary device can be configured to register the same movement as corresponding detection means arranged in secondary devices. Thereby is it possible to enable an activation signal that are registered simultaneously by different devices without actually transmitting any information or signals between the devices. This furthermore has the advantage that such an activation can't be registered by any form of bug sweeper or similar solution created to detect that a vehicle comprise alarm devices, such as the primary and secondary devices.

According to an embodiment the primary device further comprises an internal power source adapted to provide the primary device with power if the connection means are disconnected from the vehicle, and wherein the primary device further is adapted to transmit an alert via the second communication means to the secondary device indicating that the connection means has been disconnected from the vehicle.

The primary devices in many ways corresponds to the main unit of a conventional vehicle alarm system and especially in terms of what the thief is looking for. The primary device is in one embodiment arranged at a similar position as the main unit of a traditional alarm unit, such as in the engine bay, under a dash board, or in the closes vicinity of a passenger compartment. The primary devices furthermore have the task of always being active in order to prevent theft of the vehicle. Depending of the surroundings different situations requires that different parts of the primary device are active.

The primary device comprises multiple communication means that are adapted for communication via different frequencies and protocols. Depending of the communication means that currently are active is the primary device more or less hard to track and find in the vehicle. Furthermore, depending of the location of the primary device in the vehicle the primary device can be easy or difficult to spot by a thief. It is therefore an advantage with the present solution that the primary device in one embodiment comprises an internal power source adapted to provide power to the primary device if it is removed from connection with the vehicle. This enables that the primary device has enough power to transmit a distress signal or an alert message/alert, to the secondary devices arranged in the vehicle informing them that the primary devices has been disconnected. This can in addition to indicate that the vehicle is being stolen further enable the secondary devices to start distributing the role of acting as the primary devices.

According to an embodiment is the role of acting as the primary devices distributed between different secondary devices in terms of that different tasks are performed by different secondary devices.

According to an embodiment is the role of acting as the primary devices assigned to a specific secondary device.

According to an embodiment is the role of acting as the primary devices distributed over time between the secondary devices arranged in the vehicle.

It is one advantage of distributing the role of acting as the primary devices between the different secondary devices, if the primary devices is disabled or removed, that battery can be saved.

In one embodiment is the criterion for selecting the secondary devices to act as the primary devices that the secondary devices currently having the highest remaining battery life is assigned the task.

According to an embodiment is the connection means adapted to be an OBD (On-board Diagnostic) connection and the primary device can thereby be attached to any one of the OBD connectors in a vehicle.

According to an embodiment the primary device comprises third communication means. The third communication means can in one embodiment be any one of WiFi, Bluetooth, ISM, LTE, or GSM.

According to an embodiment of the primary device the connection means of the primary devices further is adapted to be connected to a communication bus of said vehicle.

It is one advantage with the present solution that the primary device can be connected to the vehicle data bus but the secondary device can't. This has the effect that the primary device can communicate with the vehicle and receive information from the vehicle. This information can, if necessary, be distributed in the mesh network of secondary devices. The information can further be utilized during normal operation conditions of the vehicle alarm and provide additional value for the end user.

The vehicle communication bus/vehicle data bus can be any form of data bus, such as a CAN-bus (controller area network).

The vehicle alarm system thereby comprises both devices that are connected to the communication bus, or any other form of communication network, as well as devices that are not connected to the vehicle. This has the effect that the secondary devices are harder to identify, can't be identified by the vehicle, or counted the number for a thief. It is further an advantage that the primary device is connected to the vehicle. The primary device can thereby both use and distribute within the network information about the vehicle during normal operation conditions when the vehicle is not stolen.

According to an embodiment of the primary device the second communication means of the primary device is adapted to transmit a presence acknowledgement to the secondary device.

In one embodiment the primary device sends an acknowledge message to the secondary device when the vehicle start moving. Both the primary and the secondary device have the ability to detect that the vehicle has started to move through their individual detection means. The primary device transmits an alert or an acknowledgement message that states that the primary device is alive. In another embodiment the primary device sends an acknowledgement comprising the distance between the primary and secondary device in order to acknowledge the presence of the primary device. The primary device through the communication means is adapted to determine the distance to other devices as part of the positioning ability as will be further described in the detailed description below.

According to an embodiment of the primary device, the second communication means operates at a frequency range of at least one frequency between 300 and 1000 MHz.

It is one advantage with the present solution that it is adapted to communicate in a relatively low frequency range, i.e. between 300 and 1000 MHz. The low frequency range allows for enhanced coverage in areas with obstacles, such as walls or buildings. The reason for this is that frequencies in the range between 300 and 1000 MHz have better characteristics for penetrating building structures and other blocking objects than frequencies used for conventional data communication such as the WiFi frequencies 2.4 and 5 GHz.

In one embodiment of the primary devices is the first communication means of the primary device adapted for positioning via, GPS, WiFi, Bluetooth, or a low frequency protocol operating in the range between 300 and 1000 MHz. This is beneficial for positioning in a mesh network between different devices.

Furthermore, although the low frequencies limit the speed of data transfer, they allow for long distance communication in relation to the required energy level. Thereby, the solution provides good coverage for reasonably large coverage areas.

The positioning can be conducted through for example RSSI (received signal strength indication), ToA (Time of Arrival, RTT (Round trip time), or any other suitable positioning system for positioning between devices.

According to an embodiment of the primary device, the second communication means further is adapted to be used for positioning of the secondary devise through conducting communication between the two devices and using any of the aforementioned positioning methods.

According to an embodiment the primary device further comprises a third communication means, wherein the first, second, and third communication means are chosen from GPS (Global Positioning System), WiFi, ISM (Industrial, Scientifically, Medical), GSM (Groupe special mobile), LTE (Long Term Evolution), ZigBee, and Bluetooth.

Different communication technologies utilized in the communication means of the devices have different benefits and drawbacks. For example, the Bluetooth technology have options for transmission with very low power consumption but the range is very limited. GPS have great performance regarding positioning in outdoor environments with a clear view of the sky but do not work indoors and consumes large amount of power in relation to for example ISM.

According to an embodiment the primary device is adapted to communicate with more than one secondary device via the communication means and the primary device is part of a mesh network with a plurality of secondary devices.

According to an embodiment the primary device is adapted to detect the difference between the power source running low in the vehicle and the primary device being removed from the vehicle.

According to an aspect of the solution the a primary device determines if the vehicle is moving and if the vehicle is moving sends an acknowledgement to all secondary devices arranged in the same vehicle. The secondary device independently determines if said vehicle is moving and wakes up from a sleep mode if the vehicle is starting to move. The secondary devices receives the acknowledgement transmitted from the primary device alternatively if no acknowledgement is received waits a configured threshold. If the acknowledgement has not been received within the threshold the secondary devices sends request to the primary device asking for a response. If the secondary devices receives the acknowledgment or a response to the request the secondary devices goes back into the sleep mode, otherwise it, or any one of the other secondary devices in the same vehicle, resumes with the role of the primary devices and thereby act as the primary devices.

In one embodiment is the connection means an OBD connector (On-board diagnostic connector) adapted to electronically connect the primary device to the vehicle. The electric connection between the primary device and the vehicle in one embodiment comprises power supply to the primary device from the vehicle. In one embodiment the electric connection further enables data communication between the primary device and the vehicle.

According to an aspect of a secondary device for use in a vehicle alarm system the secondary device comprises first communication means adapted to enable positioning of the secondary device, a local power source adapted to supply the secondary device with power, and second communication means adapted for data communication. The secondary device is adapted to be arranged in a vehicle and comprises detection means for detecting if the vehicle is moving. The secondary device is further configured to be in a sleep mode until the detection means indicates that the vehicle starts moving.

According to an embodiment the secondary device is configured to wake up from the sleep mode when the detection means indicates that the vehicle begins to move. The secondary device is further adapted to through the second communication means receive a message from the primary device indicating that the primary device is active.

According to another embodiment is the secondary device configured to wake up from the sleep mode when it receives an acknowledgement from the primary device.

According to an embodiment the secondary device is adapted to go back to sleep when the message indicating that the primary device is active is received and if the message has not been received before a certain threshold send a request via the second communication means to the primary device asking if it is active.

According to an embodiment the secondary device is adapted to act as a primary device trough taking the role of the primary device if the primary device is inactive or removed from the vehicle.

According to an embodiment the secondary device is adapted to receive a presence acknowledgement from the primary device via the second communication means.

According to an embodiment of the secondary device, the second communication means operates at a frequency range of at least one frequency between 300 and 1000 MHz.

According to an embodiment of the secondary device, the second communication means further is adapted to be used for positioning of the secondary device.

According to an embodiment the primary devices is adapted to determining the distance between the primary device and a secondary device. The devices are arranged in a wireless mesh network constituted of at least a primary device and a secondary device. In one embodiment the mesh network further comprises additional secondary devices. The primary devices in one embodiment performs positioning through:

transmitting a response request message,
starting a first counter at transmission of said response request message,
receiving a response to said response request message, stopping the counter at reception of the response to said response request message,
determining based on the counter result the distance between said first and second node.

In another embodiment the second communication means of the secondary device is adapted to enable determining of the position of said secondary device, wherein an external devices in a larger mesh network of devices receives a positioning request message from a user, including an identification of the vehicle to be positioning and the secondary device arranged in said vehicle. The external device transmits a signal, including the identification of the secondary device and receives a response signal from either another external device or directly from the secondary device. If the response is from another external device the positioning request message is forwarded until an external devices within contact range with the secondary device is reached. The external devices sends the positioning request to the secondary devices, receives a response, and calculates a distance or a direction to the secondary device by measuring the received response signal, thereby enabling of determination of the position of the secondary device.

Positioning of the secondary device from devices outside of the mesh network of the specific vehicle with means of the second communication means is important if the vehicle is placed in a way that GPS positioning is not available, for example if the vehicle is placed within a container. The second communication means are in one embodiment adapted to transmit signals via a frequency between 300 and 1000 MHz enabling that the signal can penetrate walls, containers, and other structures in a way not possible by for example GPS signals.

According to an embodiment the secondary device further comprises third communication means, wherein the first, second, and third communication means are chosen from GPS, WiFi, ISM, GSM, ZigBee, and Bluetooth.

It is one advantage with one embodiment of the present solution that the secondary device comprises communication means adapted for more than one communication standard.

According to an embodiment the secondary device is adapted to act as a primary device if the primary device is inactive and/or removed from the vehicle, wherein the secondary device further is adapted to distribute the role of the primary device between different secondary devices over time.

It is one advantage with the present solution that the system is distributed in a way that each device, secondary or primary, of the system depending of the situation can perform all tasks.

According to an embodiment are the primary and/or secondary devices dust and water resistant, preferably with a dust/water ingress rating of IP54.

According to an aspect performed by a primary device in a vehicle alarm system wherein the primary device comprises first communication means adapted to enable positioning of said primary device, connection means adapted to connect the primary device to an electric system in a vehicle, and second communication means adapted for data communication. The primary device is arranged in the vehicle and connected via the connection means to a power source of the vehicle, and the primary device performs the steps:
determine via at least one of the communication means the position of the vehicle,
transmit via the second communication means a presence acknowledgement to a secondary device arranged in said vehicle.

According to an aspect performed in a secondary device in a vehicle alarm system wherein said secondary device comprises first communication means adapted to enable positioning of the secondary device, a local power source adapted to supply the secondary device with power, and second communication means adapted for data communication. The secondary device is arranged in a vehicle and comprises detection means for detecting if the vehicle is moving, the second communication means is adapted for communication with a primary device, and the secondary device performs the steps:
detecting via the detection means if the vehicle is moving,
waking up the secondary device from a sleep mode, and
ensuring that the primary device is active and connected to the vehicle.

According to an aspect a vehicle alarm system comprises a primary device and/or a secondary device as described herein.

According to an embodiment of a vehicle alarm system the system comprises one primary device and a plurality of secondary devices.

BRIEF DESCRIPTION OF DRAWINGS

The invention is now described, by way of example, with reference to the accompanying drawings, in which.

DESCRIPTION OF EMBODIMENTS

In the following, a detailed description of the different embodiments of the solution is disclosed under reference to the accompanying drawings. All examples herein should be seen as part of the general description and are therefore possible to combine in any way in general terms. Individual features of the various embodiments and methods may be combined or exchanged unless such combination or exchange is clearly contradictory to the overall function.

Figure 1:
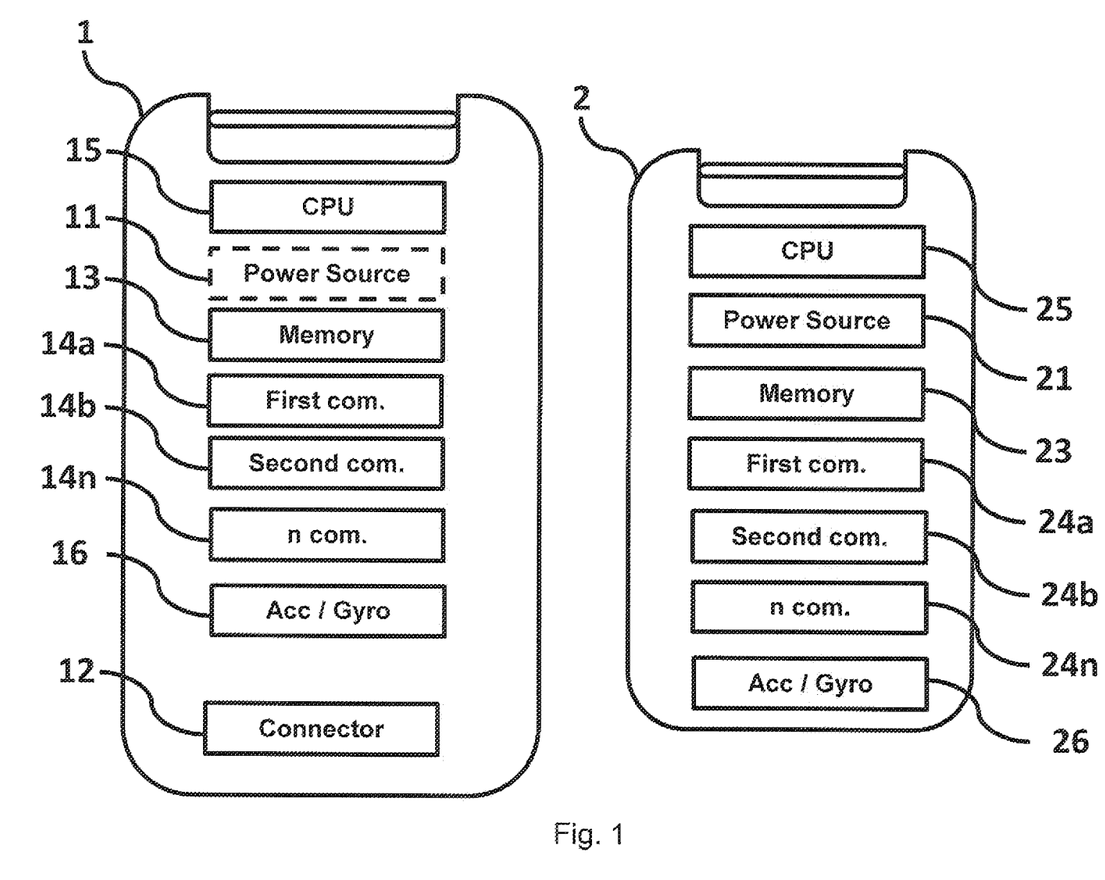
FIG. 1 shows an illustrative view of the primary device and the secondary device and components thereof.

FIG. 1 shows an illustrative view of a primary 1 and secondary 2 device that are adapted to be arranged in a vehicle alarm system 10. The primary device 1 comprises a CPU 15 adapted to perform calculations, a memory 13 adapted to store information, a power source 11, such as a battery, a first communication protocol 14a, and a second communication protocol 14b. The primary device further comprises connection means 12 adapted to electrically connect the primary device 1 to a vehicle 3, means 16 for detecting if the vehicle 3 moves, and in one embodiment additional communication protocols 14n.

The first communication protocol 14a is in one embodiment a GPS (global positioning system) communication protocol or any other protocol adapted for enabling positioning of the primary device 1. It is one of the key features of the vehicle alarm system that the vehicle position can be determined if the vehicle 3 is stolen even if the thieves take measurements to disable the vehicle alarm system 10. The second communication protocol 14b is in one embodiment a communication protocol adapted to enable data communication between the primary device 1 and at least one secondary device 2.

FIG. 1 further illustrates a secondary device 2 adapted to be arranged in a vehicle alarm system 10. The secondary device 2 comprises a CPU 22 adapted to perform calculations, a power source 21 adapted to provide power to the secondary device 2, a memory 23 adapted to store information and a first communication protocol 24a adapted to enable positioning of the secondary device 2. The secondary device 2 further comprises a second communication protocol 24b adapted for communication with a primary device 1 and other secondary devices 2. Additionally the secondary device 2 comprises means 26 for detecting if the vehicle 3 is moving as well as in one embodiment additional communication protocols 24n.

Figure 2:
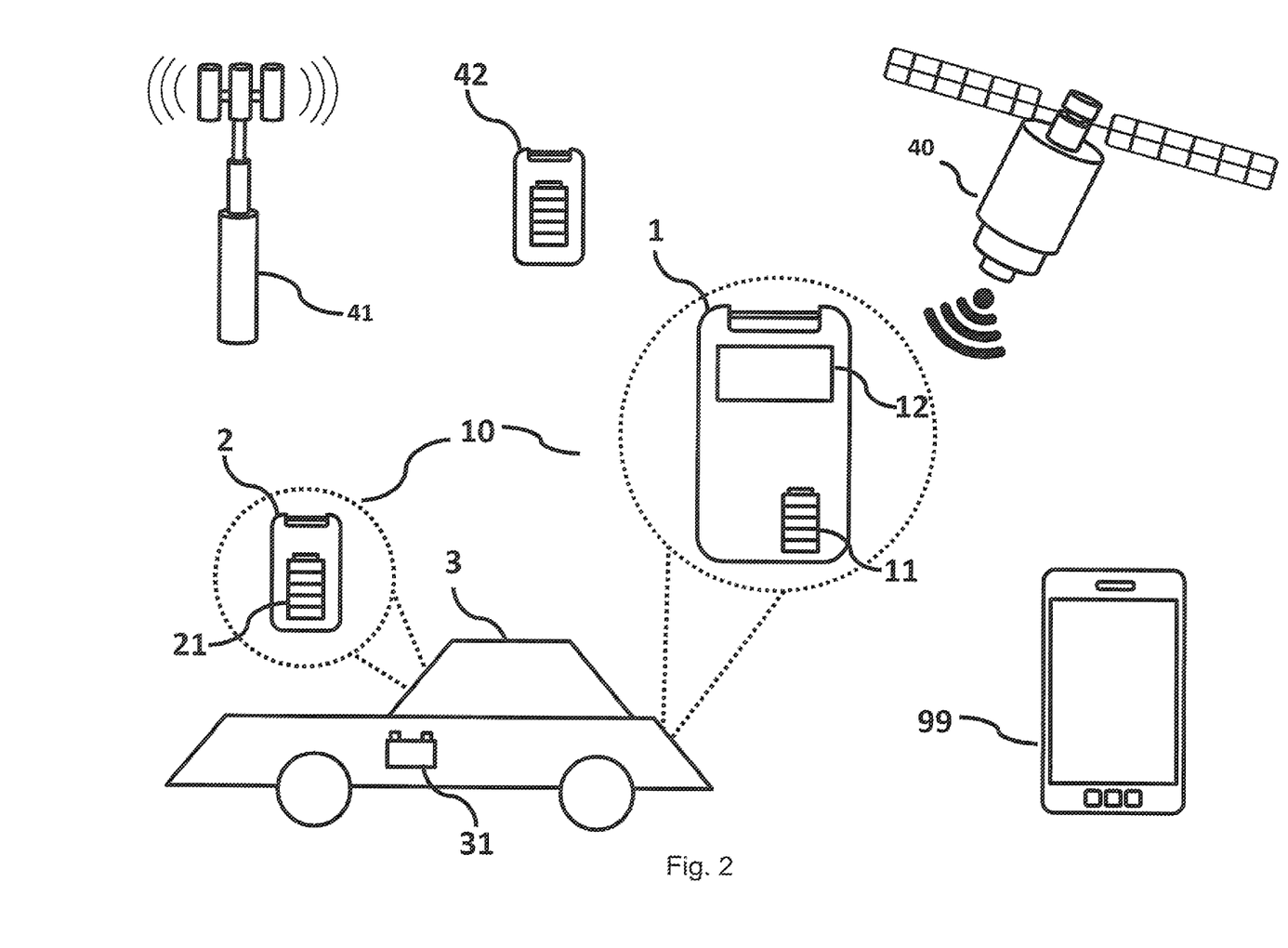
FIG. 2 illustrates a vehicle with an alarm system in an operational state.

FIG. 2 illustrates a vehicle 3 with a vehicle alarm system 10 comprising a primary device 1 adapted to work as the main unit of the alarm system 10. The main unit comprises connection means 12 for connecting the primary device 1 to a power source 31 of the vehicle 3. The power source 31 of the vehicle 3 is in an embodiment a regular battery, such as a car battery. In another embodiment is the power source 31 a direct connection to a generator of an engine arranged in the vehicle 3, a solar cell, or any other form of power source that can be used to power the primary device and that is charged or continually providing energy during normal operation of the vehicle 3.

In one embodiment the primary device 1 further comprises a second power source 11 embedded in or connected to the primary device 1. The second power source 11 is a power source adapted to maintain the primary device 1 alive for at least a short while if the primary device 1 is disconnected from its electrical connection with the vehicle 3.

FIG. 2 further illustrates a vehicle 3 comprising a vehicle alarm system constituted of a primary device 1 and a secondary device 2 arranged in the vehicle 3. The embodiment as illustrated in FIG. 2 is only an example embodiment used to describe the solution. For most embodiments it is beneficial to incorporate more than two secondary devices 2 in a vehicle alarm system 10.

The vehicle 3 can be any form of vehicle but for the purpose of the example in FIG. 2 is the vehicle a car comprising an engine and an internal power source 31, which in one embodiment is a car battery.

The primary device 1 is the main unit of the vehicle alarm system 10 and adapted to control the system during normal operations. The primary device 1 comprises connection means 12 for connecting the primary device to the vehicle 3 in order for the primary device 1 to receive power from the vehicle's internal power source 31. The primary device 1 is further in one embodiment connected to a data bus or any similar data communication network of a vehicle 3 in order to receive and/or exchange data with the vehicle 3. In one embodiment the primary device further comprises an internal power source 11, such as a battery, which is adapted to keep the primary device 11 alive for a short while long enough to send a distress signal to at least one secondary device 2 if the primary device 1 is removed from the vehicle 3 or in any other way sabotaged.

The vehicle alarm system 10 is a distributed alarm system wherein multiple devices 1, 2 are used in order to create a network of devices within a vehicle 3. The devices 1, 2 are further in one embodiment adapted to create a distributed network between different vehicles in order to enable positioning. The vehicle alarm system 10 is constituted of one primary device 1 and at least one secondary device 2. It is beneficial to have more than one secondary device 2 as will be made clear below. The secondary devices 2 are arranged at different spots in the vehicle 3 and are in one embodiment not connected to the vehicle 3. The secondary devices 2 each comprises means capable of performing the same task as the primary device 1 except for the power connection to the vehicle 3. This enables that the secondary devices 2 if performing more advance tasks, such as the ones performed by the primary device 1, drain the battery rather quick.

The vehicle alarm system 10 is therefore arranged with both a primary device 1 and secondary devices 2. The primary device 1 has the responsibility to maintain the functionality of the vehicle alarm during normal operation conditions. The primary device 1 further controls all conventional alarm functions that would be known to the person skilled in the art, such as alarm signals, immobilizers, and other vehicle alarm functions. The secondary devices 2 have the responsibility to ensure that the primary device 1 is functional through receiving acknowledgement of the primary device 1 based on predetermined conditions. An example of a predetermined condition is that the function and availability of the master device 1 is checked as soon as the vehicle 3 starts moving.

The secondary device 2 comprises an internal power source 21, in one embodiment a battery, adapted to supply power to the secondary device 2. The secondary device 2 is not connected to the vehicle 3 but arranged in the vehicle 3. Thereby is the secondary device 2 independent from the electric system of the vehicle 3 and can be hidden at any space in the vehicle 3. This has the effect that any number of secondary device 2 can be arranged within a vehicle 3 without modifying the vehicle 3. The secondary devices 2 are in one embodiment asleep for almost all their life in order to save battery. However, every time the vehicle 3 starts moving the secondary devices 2 have to ensure that the primary device 1 is functional. This can be done with different methods as will be described below.

According to an embodiment the primary device 1 comprises means 16 for detecting if the vehicle 3 is moving. The means 16 for detecting if the vehicle 3 is moving can for example be an accelerometer, a gyro, or a combination thereof. The person skilled in the art understands that the means 16 for detecting if the vehicle 3 is moving further can be any other form of sensor means or means enabled for interpreting a signal from the vehicle 3 indicating that it is moving. In one embodiment is the means 16, 26 for detecting if the vehicle is moving the same type of means in both the primary 1 and secondary 2 device.

In one embodiment the primary device 1 detects that the vehicle is moving 3 and transmits an acknowledgement. The secondary devices 2 each detects that the vehicle 3 is moving through their detection means 26 and wakes up. If the secondary devices 2 receives the acknowledgement from the primary device 1 they go back to sleep, otherwise they transmit a request asking if the primary device 1 is alive and functioning. If the primary device 1 responds and all is well the secondary devices 2 goes back to sleep mode, otherwise the secondary devices 2 assign one of the secondary devices to become the new primary device 1. When a secondary device 2 is appointed the role as primary device 1 it is still not connected to the vehicle 3 and thereby starts to drain its internal battery much faster than under normal conditions. Therefore, in one embodiment are the secondary devices 2 adapted to share the responsibilities of the primary device 1 over time draining each of their battery in order to prolong the life span of the system 10.

In one embodiment if the primary device 1 is removed from the vehicle 3 it sends a distress signal alerting the secondary devices 2 that one of them has to resume responsibility as the primary device 1.

FIG. 2 further illustrates that both the primary 1 and the secondary 2 devices are arranged within the vehicle 3. Preferred installation locations for the primary device 1 is near an OBD connector, in the engine compartment, under the dashboard, or at any other location in a vehicle wherein the primary devices can be coupled to an internal energy source 31. In some embodiments the primary device 1 further is arranged in a way that it can be electronically coupled to data communication bus of the vehicle 3, such as a CAN (Controller Area Network) bus. The vehicle alarm system 10 may comprise any number of secondary devices 2 depending of the security level that is desired for the specific vehicle 3. For example, a vehicle alarm system 10 comprising two secondary devices 2 comprises less redundancy than a system 10 comprising ten secondary devices 2. The secondary devices 2 may be arranged at any location in the vehicle 3 depending on the model of the vehicle 3 and the specific vehicle 3. In one embodiment are the secondary devices 2 arranged on different spots of each single production vehicle 3 meanwhile the primary device 1 is located at the same location. Through such an arrangement it is made more difficult for the thief to identify the position of each secondary device 2. Furthermore, a thief trying to disable the alarm system have no idea if the vehicle 3 have two or twenty secondary devices 2 hidden within. Additionally, the thief do not know how many of the secondary devices 2 that currently are at sleep and/or active creating a situation wherein the entire vehicle 3 needs to be striped into parts in order to ensure that all secondary devices 2 has been identified.

FIG. 2 further illustrates that different communication units 99, 40, 41, 42 can be used in order to communicate from outside of the vehicle alarm system 10 in order to for example track the vehicle 3. For example, in one embodiment can a user utilize a smartphone 99, computer, PDA, tablet, or any other form of devices that is authorized to contact the vehicle alarm system 10 to track the vehicle 3, activate the alarm, or other convenient tasks as known to the person skilled in the art.

The vehicle alarm system 10 can further utilize the first communication means, for example being adapted to communicate via GPS, to communicate with a satellite 40 in order to determine the position of the vehicle. In another situation the vehicle alarm system 10 can utilize the second communication means to communicate via for example ISM of 300-1000 MHz in order to communicate with an external secondary device 42 and utilize ToA, RTT, RSSI, or any other suitable method to determine the position of the vehicle 3. Such communication can for example be conducted by a secondary device 2.

In another situation is GSM or LTE used to communicate with a cell tower 41, both for communication and positioning purposes. Beneficially could this be performed by a third communication means in either the primary 1 or secondary 2 device.

Figure 3:
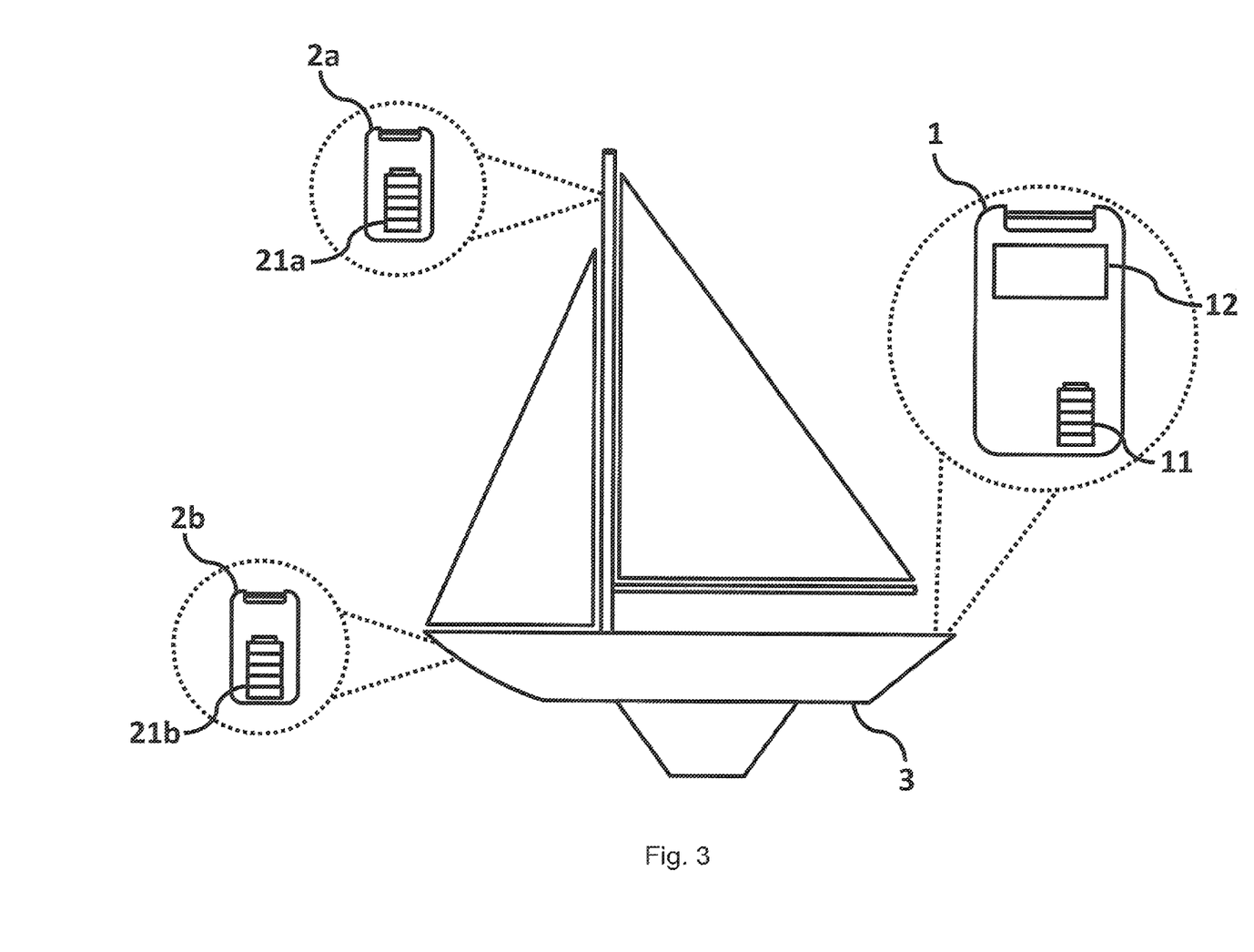
FIG. 3 illustrates a vehicle with a primary device and multiple secondary devices.

FIG. 3 illustrates an embodiment wherein a primary device 1 is arranged in a vehicle 3. The primary devices 1 comprises connection means 12 that are adapted to electronically couple the primary device 1 to the vehicle 3. The main purpose for this is to supply the primary device 1 with power from the vehicle 3 however in one embodiment is the connection means 12 further adapted for data communication with the vehicle 3. FIG. 3 further illustrates that two secondary devices 2a, 2b are arranged within the vehicle 3, each comprising their own power source 21a, 21b. The vehicle 3 can be any form of vehicle 3 such as a car, boat, truck, train, airplane, trailer, bicycle, motorcycle, or any other form of vehicle 3 wherein a vehicle alarm system 10 can be arranged.

Figure 4:
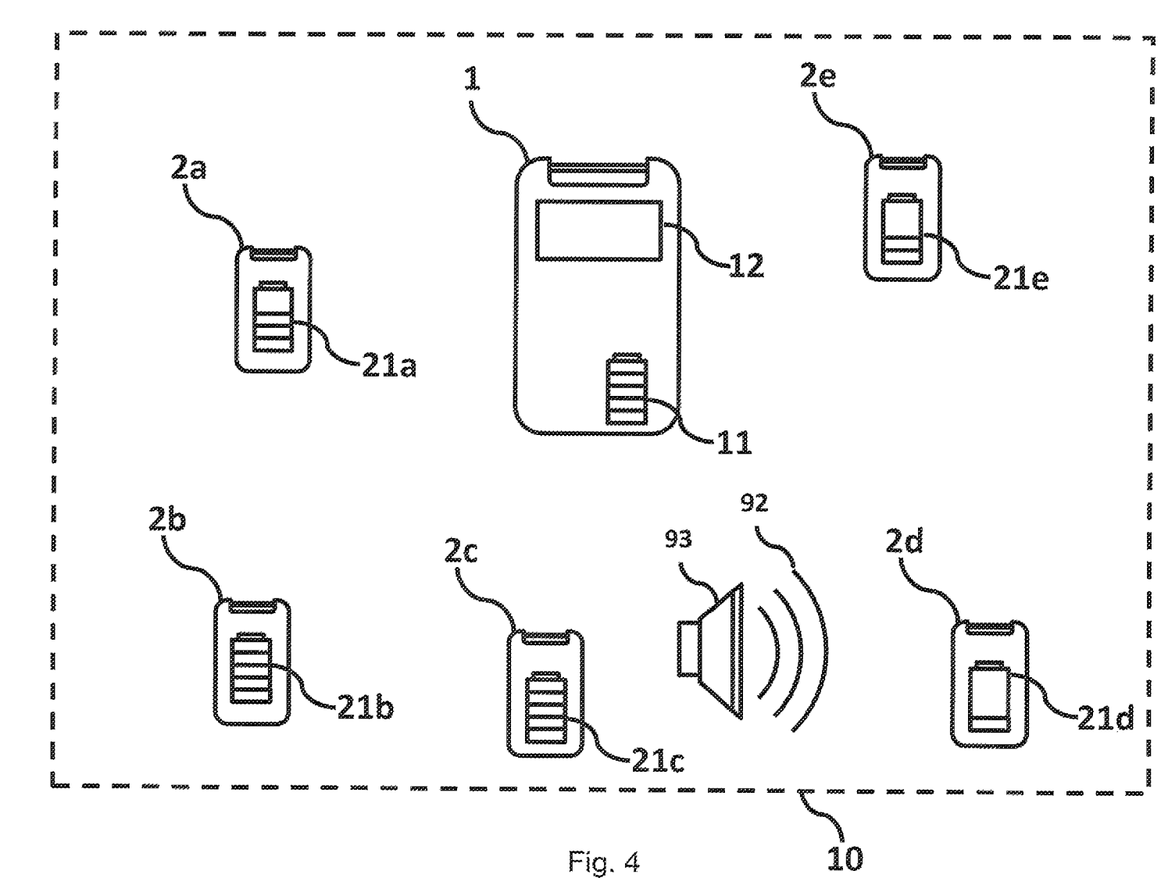
FIG. 4 illustrates an example of a vehicle alarm system comprising a primary device, multiple secondary devices, and other alarm means.

FIG. 4 shows an illustrative view of a vehicle alarm system 10 comprising a primary device 1 and multiple secondary devices (2a, 2b, 2c, 2d, 2e). In order to explain some of the advantages of the vehicle alarm system 10 we assume that the alarm system 10 as illustrated in FIG. 4 is arranged in a vehicle 3. The vehicle 3 is for the purpose of this example a car 3 that is normally driven by a user as a private car. It is for example used for going to work, shopping, and picking up the family's children from school. During a normal week and normal operation of the vehicle the family do not pay much attention to the alarm system 10 more than that it is turned on every time they leave the vehicle 3 and turned off every time they use the vehicle 3. Occasionally the user realizes that the parking lot where the family left the car is very big and therefore uses a smartphone 99, or any other suitable device, to locate the vehicle via the alarm system 10. The alarm system 10 utilizes one of the communication means 14a, 14b, 14n to determine a position of the primary device 1. In most situations will the vehicle alarm system 10 automatically utilize the first communication means 14a which in one embodiment is a GPS system. If the vehicle 3 is parked in an area with limited GPS coverage, such as a parking garage or in a city with many tall buildings limiting the clear view of the sky the vehicle alarm system 10 instead utilize either the second communication means 14b or any other communication means 14n that is arranged in the primary device 1. The primary device can comprise any number of communication means 14n each adapted for different communication standards. The determination of the position of the primary device 1 is if GPS coverage isn't available made through for example ToA, RSSI, RTT, or any other suitable method for positioning or distance calculations. The technologies used for this in the communication means 14n can for example be any one of GSM, ISM, LTE, WiFi, Zigbee, or Bluetooth.

During normal operation of the vehicle 3 the primary device 1 handles most of the tasks that the vehicle alarm system 10 carries out. The secondary devices 2 only serves as backup units that every time the vehicle starts moving after it has been stationary for more than a predetermined threshold stating time checks that the primary device 1 is active and present in the vehicle 3. If the family's car at one situation is stolen and the thief starts using the vehicle 3 it can be tracked immediately in same way that the user tracks the car 3 in the parking lot and the system can also be configured to transmit an alert to the user that the vehicle 3 has been stolen.

In one embodiment is the vehicle alarm system 10 adapted to indicate through transmitting an alert if the vehicle 3 starts moving without the presence of an approved mobile device 99, such as any one of the smartphones 99 belonging to the family members. Such an alert could for example be transmitted to any one of the family members, the police, or the insurance company.

If the thief that are about to or already have stolen the car 3 starts to tamper or interfere with the vehicle alarm system 10 the system 10 automatically adapt to the situation. For example, in one embodiment the thief start looking for a tracking device connected to the vehicle bus and/or the vehicle power source 31 and identifies the primary device 1. The primary devices 1 is destroyed or removed from the vehicle. The thief feeling confident that the vehicle 3 now is untraceable drives away or lifts the car on to a towing truck. Either has the primary devices 1 already sent a distress signal that is picked up by for example the user or as soon as the vehicle 3 starts moving the secondary devices 2 of the vehicle 3 detects that the primary device 1 has been compromised and immediately notifies with an alert that the vehicle 3 has been stolen. Additionally the secondary devices 2 determines that one of the secondary devices 2*a*, 2*b*, 2*c*, 2*d*, 2*e* shall resume the responsibility of acting as a primary device enabling all the functionality that the primary device 1 had except for the connection to the vehicle 3. The lack of connection to the vehicle 3 is beneficial both since it make the secondary device 2 harder to find for the thief but also since it enables the secondary device 2 to be located anywhere in the vehicle 3, for example but not limited to in the upholstery of a seat, in the sealing, in a wheel arch, and any other suitable hiding place. FIG. 4 further illustrates how the battery level 21*a*, 21*b*, 21*c*, 21*d*, 21*e* may differ between the secondary devices 2 in the vehicle alarm system 10 which could be one of the criteria for selecting which secondary devices 2 that shall act as the primary device. As the battery level 21*a*, 21*b*, 21*c*, 21*d*, 21*e* relation change between the different secondary devices 2*a*, 2*b*, 2*c*, 2*d*, 2*e* is the role of acting as the primary devices moved to another secondary devices 2*a*, 2*b*, 2*c*, 2*d*, 2*e*.

Independent of if the primary device 1 has been set out of function by the thief or not the vehicle alarm system 10 thereby is capable of communicating via at least two different communication standards through the first 14*a*, 24*a* and the second 14*b*, 24*b* communication means. This enables that different secondary devices 2 can be in different communication modes and thereby avoid both detection and signal blocking by altering between the different protocols until the communication is successful. The secondary devices 2 are not connected to the vehicle 3 and thereby can only rely on their own internal power source 21. However, the secondary devices 2 are during the normal mode and during most of its lifetime almost always in a sleep mode. Under normal operation conditions the secondary devices 2 are only active when the vehicle 3 has started to move and they listen for an acknowledgement from the primary device 1 and thereby saves their battery life until they are needed if the primary device 1 is disabled. The battery of the secondary devices 2 can thereby without problem survive the service interval of the vehicle 3.

FIG. 4 further illustrates that the vehicle alarm system 10 may comprise additional means, such as sound means 93 generating an alarm sound 92. The person skilled in the art understands that the vehicle alarm system 10 as disclosed herein further can comprise other means suitable for an alarm system.

In another embodiment as illustrated by FIG. 4 the battery of the secondary devices 2 are saved by a sleep mode. The devices 2 are only active when they receive a signal from the primary device 1. The signal or acknowledgment from the primary device 1 comprises a wake up parameter, such as used for wake over LAN.

Figure 5:
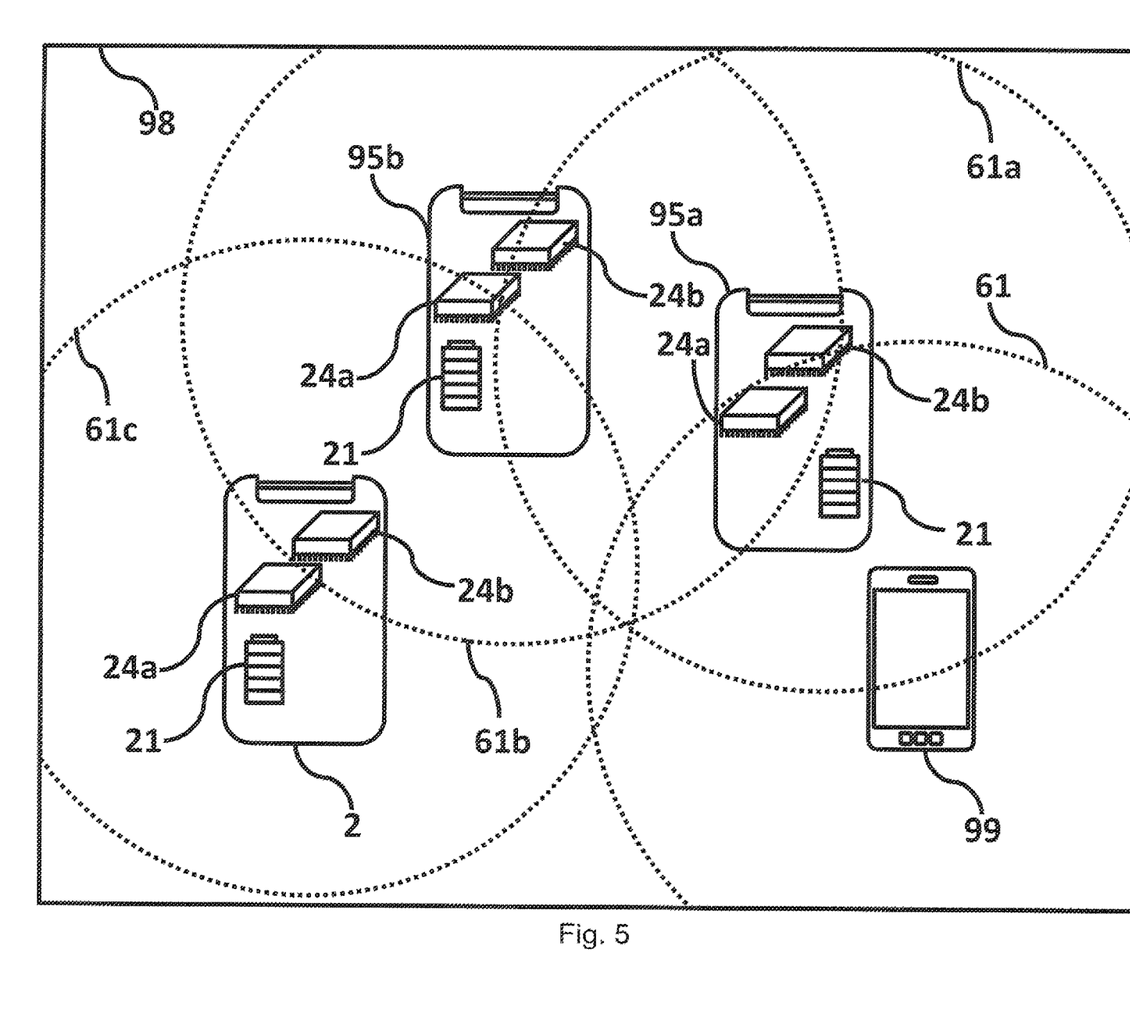
FIG. 5 illustrates an embodiment of a vehicle alarm system wherein positioning is conducted utilizing the second communication means.

FIG. 5 illustrates external devices 95*a*, 95*b* that are similar or identical to the secondary devices 2 or the primary devices 1. The external devices can in one embodiment be devices of another vehicle comprising a similar alarm system. In another embodiment are the external devices 95*a*, 95*b* base stations adapted for communication via at least first and second communication means. The external devices 95*a*, 95*b* together with other devices, such as the devices 1, 2 in the vehicle 3 constitutes a positioning network 98. The positioning and communication network 98 is in one embodiment constituted of multiple devices 2 that together builds a distributed network. In one embodiment is the positioning and communication network 98 constituted of secondary devices 2, primary devices 1, and base stations 95 adapted to communicate through the frequencies as described herein, and/or Bluetooth, Wi-Fi, GSM, 3G, LTE, or any other suitable communication frequency/protocol.

FIG. 5 further illustrates a mobile device 99 that has a first coverage area 61. The first coverage area 61 is a distance around the mobile device 99 where its communication can reach. If the mobile device 99 sends a positioning request or other information to a primary 1 or secondary 2 device that is within the first coverage area 61 the information is transmitted directly to the device 1, 2 of the vehicle 3. If the devices 1, 2 of the vehicle alarm system 10 are outside of the coverage area 61 for the mobile device 99 the mobile device 99 looks for an external devices 95 in the distributed network to send the information to. The mobile device 99 as shown in FIG. 5 finds that the first external device 95*a* is within the coverage area 61. The information or position request is then sent to the first external device 95*a* that starts to search for the primary devices 1 or secondary device 2 of the vehicle 3. If it can't be found in the second coverage area 61*a* of the first external device 95*a* the first external device 95*a* searches for another device that is within the second coverage area 61*a*. The first external device 95*a* finds a second external device 95*b* that is within the second coverage area 61*b* and the second external device 95*b* starts to search for the primary 1 or secondary 2 device of the vehicle alarm system 10. The second external device 95*b* finds that the secondary device 2 is within the third coverage area 61*b* and it is now possible to determine the position of the secondary device 2 via means of the second communication means 24*b* via ToA, RSSI, RTT, or similar, or via the first communication means 24*a* through GPS.

Figure 6:
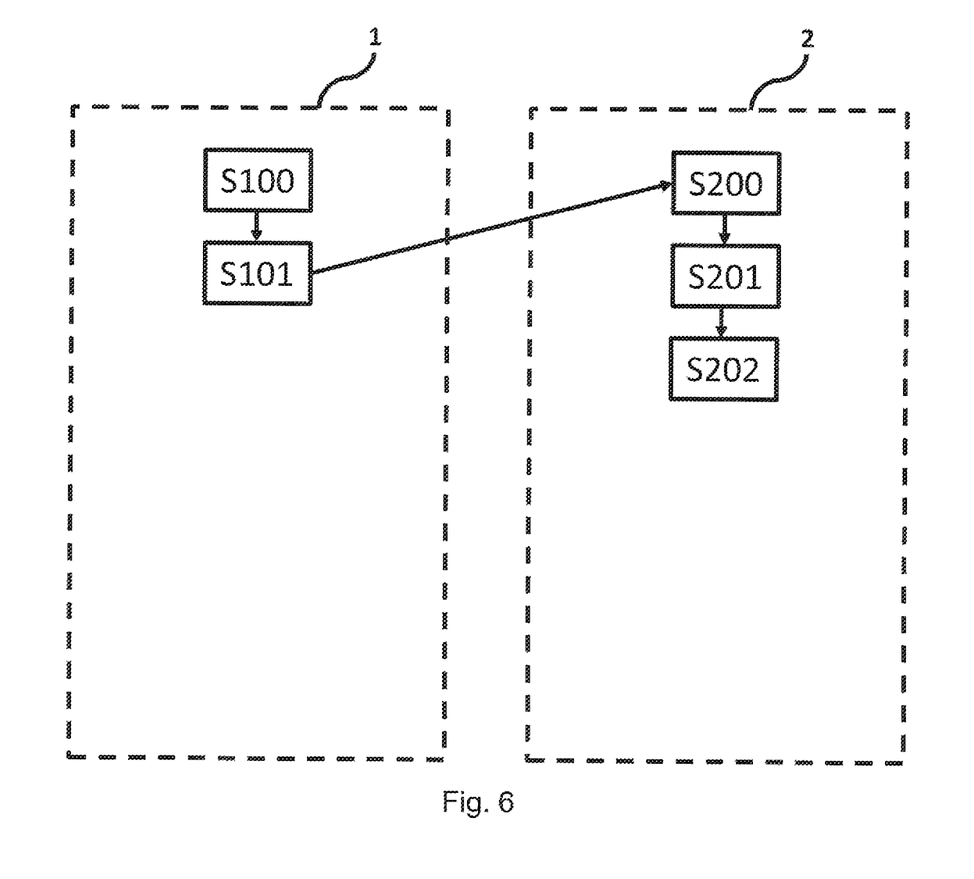
FIG. 6 illustrates an embodiment of a flow chart for a vehicle alarm system.

FIG. 6 illustrates a schematic view of one embodiment as described herein wherein the primary device 1 detects that the vehicle has started to move S100 and sends an acknowledgement S101 to the secondary device 2. The secondary device 2 wakes up S200 and receives S201 the acknowledgement from the primary device 1. The secondary devices 2 goes back to sleep S202.

In another embodiment as illustrated in FIG. 6 the primary device 1 detects S100 through its detection means that the vehicle is moving. Simultaneously the secondary device detects S200 the same movement and wakes up starting to listen for an acknowledgement from the primary device 1. The primary device 1 transmits an acknowledgement S101 that it is alive and functioning. The secondary devices 2 checks that the acknowledgement is ok S201 and goes back to sleep S202.

We claim:

1. A primary device in a vehicle alarm system, wherein the primary device comprises a first communication means to enable positioning of the primary device, a connection means adapted to connect the primary device to an electric system in a vehicle, and a second communication means for data communication, wherein the primary device is adapted to be arranged in the vehicle and the connection means are adapted to connect the primary device to a power source of the vehicle, the second communication means is adapted to communicate with a secondary device arranged hidden in the vehicle and is adapted to transmit a presence acknowledgement to the secondary device, wherein the primary device further comprises a detection means adapted to detect if the vehicle is moving, wherein the detection means is an accelerometer, a gyro, or a combination thereof, and the primary device is adapted to transmit a message to the secondary device through the second communication means indicating that the primary device is active when the detection means indicates that the vehicle has started to move.

2. The primary device according to claim 1, wherein the primary device further comprises an internal power source adapted to provide the primary device with power if the connection means are disconnected from the vehicle, and wherein the primary device further is adapted to transmit an alert via the second communication means to the secondary device indicating that the connection means has been disconnected from the vehicle.

3. The primary device according to claim 1, wherein the primary device comprises a third communication means.

4. The primary device according to claim 1, wherein the connection means of the primary device further is adapted for connection to a communication bus of the vehicle.

5. The primary device according to claim 1, wherein the second communication means operates at a frequency range of frequency between 300 and 1000 MHz.

6. The primary device according to claim 1, wherein the second communication means further is adapted to be used for positioning of the primary device relative the secondary device.

7. The primary device according to claim 1, wherein the primary device further comprises a third communication means, wherein the first, second, and third communication means are chosen from GPS, WiFi, ISM, GSM, ZigBee, and Bluetooth.

8. The primary device according to claim 1, wherein the primary device is adapted to communicate with more than one secondary device via the second communication means and the primary device is part of a mesh network with a plurality of secondary devices.

9. A secondary device in a vehicle alarm system, wherein the secondary device comprises a first communication means to enable positioning of the secondary device, a local power source to supply the secondary device with power, and a second communication means for data communication, wherein the secondary device is adapted to be arranged hidden in a vehicle, and wherein the secondary device is adapted to receive a presence acknowledgement from a primary device via the second communication means and comprises a detection means adapted to detect if the vehicle is moving, wherein the detection means is an accelerometer, a gyro, or a combination thereof, and in that the secondary device is configured to be in a sleep mode until the detection means indicate(s) that the vehicle starts moving, and wherein the secondary device is adapted to through the second communication means to receive a message from the primary device indicating that the primary device is active.

10. The secondary device according to claim 9, wherein the secondary device is adapted to go back to sleep when the message indicating that the primary device is active is received, and, if the message has not been received within a predetermined time threshold, send a request via the second communication means to the primary device asking if it is active.

11. The secondary device according to claim 9, wherein the secondary device is adapted to a role, acting as a primary device enabling all the functionality of the primary device except for the connection to the vehicle, if the primary device is inactive or removed from the vehicle.

12. The secondary device according to claim 9, wherein the second communication means operates at a frequency range between 300 and 1000 MHz.

13. The secondary device according to claim 9, wherein the second communication means further is adapted to be used for positioning of the secondary device.

14. The secondary device according to claim 9, wherein the secondary device further comprises a third communication means, wherein the first, second, and third communication means are chosen from GPS, WiFi, ISM, GSM, ZigBee, and Bluetooth.

15. The secondary device according to claim 9, wherein the secondary device is adapted to act as a primary device if the primary device is inactive and/or removed from the vehicle, wherein the secondary device further distributes the role of the primary device between different secondary devices over time.

16. A method performed by a primary device in a vehicle alarm system, wherein the primary device comprises a first communication means adapted to enable positioning of the primary device, connection means adapted to connect the primary device to an electric system in a vehicle, and a second communication means adapted for data communication, wherein the primary device is arranged in the vehicle and connected via the connection means to a power source of the vehicle, and in that the method comprises the steps:
  determining via at least one of the communication means the position of the vehicle,
  determining, via a detection means adapted to detect if the vehicle is moving, wherein the detection means is an accelerometer, gyro, a combination thereof, that the vehicle is moving,
  transmitting via the second communication means a presence acknowledgement to more than one secondary device arranged hidden in the vehicle.

17. A method performed in a secondary device in a vehicle alarm system, wherein the secondary device comprises a first communication means adapted to enable positioning of the secondary device, a local power source adapted to supply the secondary device with power, and a second communication means adapted for data communication, wherein the secondary device is arranged hidden in a vehicle and comprises a detection means adapted to detect if the vehicle is moving, wherein the detection means is an accelerometer, a gyro, or a combination thereof, the second communication means is adapted for communication with a primary device, the method comprising the steps:
  detecting via the detection means if the vehicle is moving,
  waking up the secondary device from a sleep mode,
  receiving through the second communication means a message from the primary device, and
  ensuring via the message that the primary device is active and connected to the vehicle.

18. A vehicle alarm system comprising at least one of:
  the primary device in a vehicle alarm system according to claim 1, and
  a secondary device in a vehicle alarm system wherein the secondary device comprises a first communication means to enable positioning of the secondary device, a local power source to supply the secondary device with power, and a second communication means for data communication, wherein the secondary device is adapted to be arranged hidden in a vehicle, and wherein the secondary device is adapted to receive a presence acknowledgement from a primary device via the second communication means and comprises a detection means adapted to detect if the vehicle is moving, wherein the detection means is an accelerometer, a gyro, or a combination thereof, and in that the secondary device is configured to be in a sleep mode until the detection means indicate(s) that the vehicle starts moving, and wherein the secondary device is adapted to through the second communication means to receive a message from the primary device indicating that the primary device is active.

19. The vehicle alarm system according to claim 18, wherein activation of the primary and secondary devices is performed simultaneously via the detection means of both the primary and secondary devices without the transmission of a radio signal between the primary and secondary devices.

\* \* \* \* \*